United States Patent [19]
Kelley

[11] Patent Number: 5,598,591
[45] Date of Patent: Feb. 4, 1997

[54] ADJUSTABLE MATTRESS SUPPORT ARRANGEMENT FOR VEHICLES SUCH AS TRUCKS

[76] Inventor: Roland F. Kelley, 1115 Hwy. 146 #802, Texas City, Tex. 77590

[21] Appl. No.: 372,099

[22] Filed: Jan. 13, 1995

[51] Int. Cl.$^6$ ............................................. A47C 17/64
[52] U.S. Cl. .................... 5/118; 5/610; 254/122
[58] Field of Search ................ 5/118, 611, 610, 5/615; 254/122

[56] References Cited

U.S. PATENT DOCUMENTS

| | | |
|---|---|---|
| 3,174,722 | 3/1965 | Alm ........................................... 5/615 |
| 3,371,359 | 9/1966 | Dome . | 
| 3,760,436 | 9/1973 | Zach et al. . |
| 4,144,601 | 3/1979 | Anderson et al. . |
| 4,196,483 | 4/1980 | Lefler et al. . |
| 4,541,134 | 9/1985 | Black et al. . |
| 4,669,139 | 6/1987 | Richter, Jr. . |
| 4,979,248 | 12/1990 | Kelly ........................................... 5/118 |
| 4,989,281 | 2/1991 | Christensen .............................. 5/118 |
| 5,218,728 | 6/1993 | Lloyd ........................................ 5/118 |

*Primary Examiner*—Flemming Saether
*Attorney, Agent, or Firm*—Chilton, Alix & Van Kirk

[57] ABSTRACT

The mattress is mounted on a rectangular frame and underlying the rectangular frame, at the front and rear ends thereof, are vertical adjusting systems. Each vertical adjusting system includes an expandable air cushion, which is expandable and contractable in the vertical direction, and intersecting link arrangements at the front and rear of each expandable cushion. Each expandable cushion is separately connected to a source of air under pressure which may be either the air compression system of the vehicle in which the system is mounted or a separate air compression system. With the arrangement, the mattress can either be raised or lowered vertically, or it can be tilted.

8 Claims, 5 Drawing Sheets

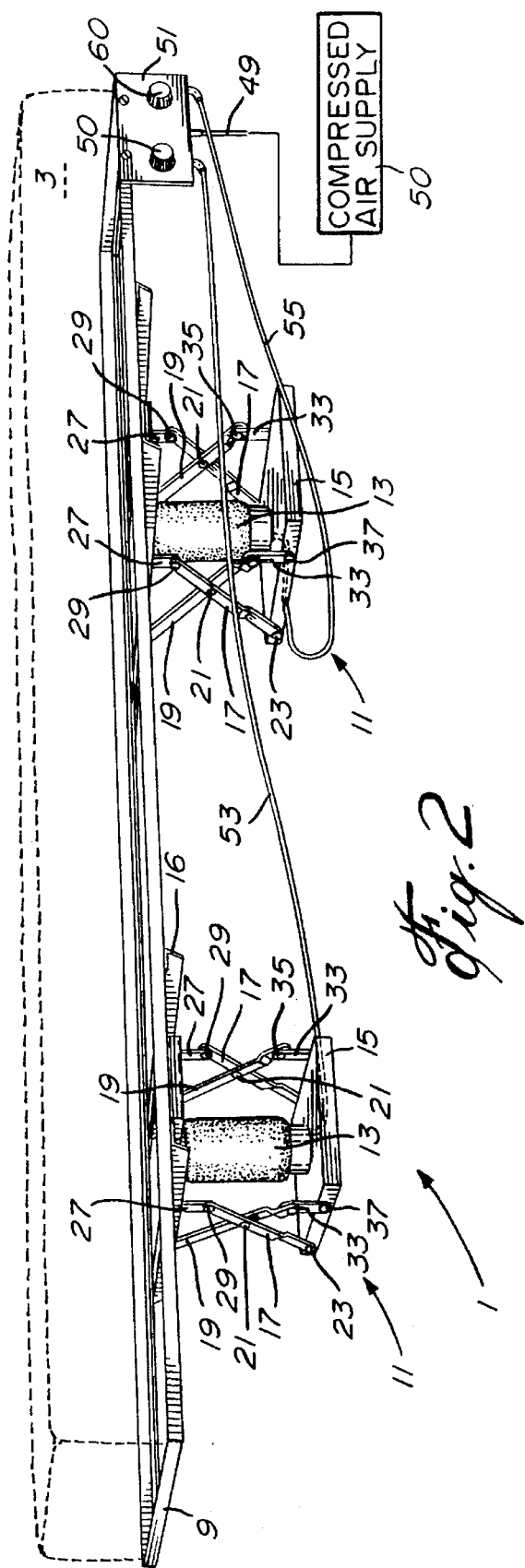

ADJUSTABLE MATTRESS SUPPORT ARRANGEMENT FOR VEHICLES SUCH AS TRUCKS

BACKGROUND OF INVENTION

1. Field of the Invention

The invention relates to an adjustable mattress support arrangement for adjustably supporting a matress in the cab of a vehicle such as a truck. More specifically, the invention relates to such an arrangement which utilizes expandable air cushions for the adjusting process, the expandable air cushions being supported by mechanical means at the front and rear end of each expandable air cushion.

2. Description of Prior Art

It is known in the prior art to provide suspension systems or adjustment systems for mattresses on beds in the cabs of trucks. Such systems are illustrated in, for example, U.S. Pat. No. 3,371,359, Dome, Mar. 5, 1968, U.S. Pat. No. 3,760,436, Zach et al, Sep. 25, 1973, U.S. Pat. No. 4,144,601, Anderson et al, Mar. 20, 1979, U.S. Pat. No. 4,196,483, Lafler et al, Apr. 8, 1980 and U.S. Pat. No. 4,669,139, Richter, Jr., Jun. 2, 1987.

The '359 patent teaches a mattress suspension system which includes suspension units 40 and 41 at either end of the system and shock absorbers 120 and 121, also at either end of the system. The mattress is vertically adjustable by action of the suspension system.

The '436 patent includes fore and aft isolation mechanisms for isolating the mattress from pitching movements in the cab of a truck. The isolation mechanism consists of parallel links at either end of the mattress suspension system which forms a pendulum-like arrangement. Vertical suspension is provided by a scissors linkage and a gas spring.

In the '601 patent, cushioned movement for a mattress in the cab of a truck is provided, in the vertical direction, by scissored linkages, at each end of the mattress, together with air cushions. The ends of one of the links of each scissor include a roller, mounted in a guide, to provide cushioning in the horizontal direction.

An adjustable mattress support for use in the cab of a truck, as taught in the '483 patent, includes a raising means consisting of intersecting linkage arrangements at both ends of the support together with a fluid cylinder. The raising means can be operated to raise or lower the mattress vertically.

The '139 patent teaches a multipositional sleeper for the cab of a truck which consists of an upper body unit, for supporting the upper body either horizontally or at an acute angle to the horizontal and a lower body unit which supports the legs either horizontally or in a knee bent position. Both upper and lower body units are controlled by air springs.

Also known in the art is a vibration damping support, for example, a suspension unit for a stretcher as taught in U.S. Pat. No. 4,541,134, Black et al, Sep. 17, 1985. It consists of a pair of cantilever arms controlled by respective gas liquid suspension units.

SUMMARY OF INVENTION

It is an object of the invention to provide an adjustable mattress support arrangement which includes expandable air cushion means.

It is a further object of the invention to provide such a support arrangement wherein mechanical support is provided for operation in co-operation with said expandable air cushion means, It is a still further object of the invention to provide such an arrangement wherein the mattress can be adjusted by operating one expandable air cushion at a time, or it can be vertically raised and lowered by operating both expandable air cushions simultaneously.

In accordance with a particular embodiment of the invention there is provided an adjustable mattress support arrangement for adjustably supporting a mattress in the cab of a truck, comprising:

an elongated mattress support member, having a front half and a rear half, for mounting said mattress; and expandable air cushion means being expandable and contractable in the vertical direction;

a first vertical adjusting system underlying said elongated mattress support member at the front half thereof and a second vertical adjusting support system underlying said elongated mattress support member at the rear half thereof, said first and second vertical adjusting systems each comprising:

a first intersecting link arrangement at the front end of said mattress and a second intersecting link arrangement at the rear end of said mattress, said first and second intersecting link arrangements being expandable and contractable with the expansion and contraction of said expandable air cushion means; and means for separately applying air under pressure to said expandable air cushion means;

whereby, the vertical height of said elongated mattress support member can be adjusted; and whereby the elongated mattress support member is supported by said expandable air cushion means and said intersecting link arrangements at all vertical positions thereof.

In accordance with a further particular embodiment of the invention there is provided an adjustable mattress support arrangement for adjustably supporting a mattress in the cab of a truck, comprising:

an elongated mattress support member, having a front half and a rear half, for mounting said mattress; and a first vertical adjusting system underlying said elongated mattress support member at the front half thereof and a second vertical adjusting support system underlying said elongated mattress support member at the rear half thereof, said first and second vertical adjusting systems each comprising:

an expandable air cushion being expandable and contractable in the vertical direction;

a first intersecting link arrangement at the front end of said expandable air cushion and a second intersecting link arrangement at the rear end of said expandable air cushion, said first and second intersecting link arrangements being expandable and contractable with the expansion and contraction of said air cushion; and means for separately applying air under pressure to said air cushion of said first vertical adjusting system and said air cushion of said second vertical adjusting system;

whereby, the vertical height of said elongated mattress support member can be adjusted at either the front or rear ends thereof or at both ends simultaneously; and whereby the elongated mattress support member is supported by said air cushions and their associated intersecting link arrangements at all vertical positions thereof.

BRIEF DESCRIPTION OF DRAWINGS

The invention will be better understood by an examination of the following description, together with the accompanying drawings, in which:

FIG. 2 is a perspective view of the mattress support arrangement in accordance with the invention;

FIG. 7 illustrates a feature which can be used with either the FIG. 1 or the FIG. 6 embodiment.

DESCRIPTION OF PREFERRED EMBODIMENTS

Figure 1:
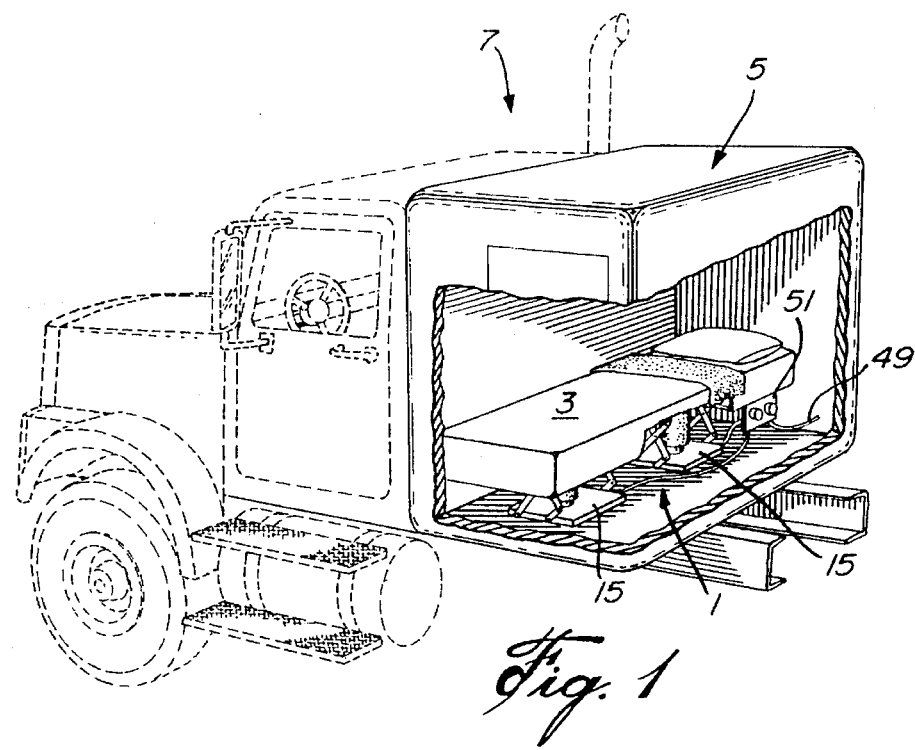
FIG. 1 is a perspective view of the cab of a truck illustrating the disposition of the adjustable mattress support arrangement in accordance with the invention.
Figure 4:
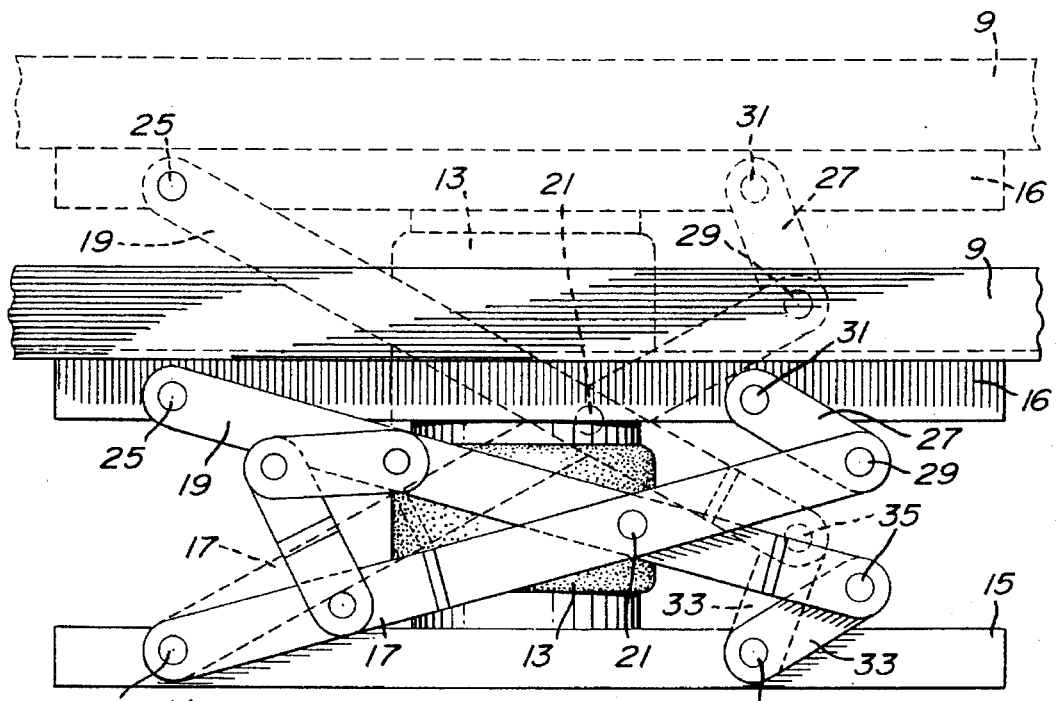
FIG. 4 is an end view of one of the expandable air cushions and its supporting structure showing the arrangement at two different vertical levels.

As seen in the embodiment illustrated in FIGS. 1 to 5, the adjustable mattress support arrangement, illustrated generally at 1, adjustably supports a mattress 3 in a cab 5 of a truck 7. As seen in FIG. 2, the adjustable mattress support arrangement comprises an elongated mattress support member comprising a rectangular frame 9. Disposed at the front end and the rear end of the adjustable mattress support arrangement and underlying the rectangular frame 9 are two vertical adjustment systems illustrated generally at 11. The adjustable support systems, also shown in FIGS. 3 and 4, include expandable air cushions 13 which are manufactured using a surface of a deformable material, typically an elastomeric type of material. In the inventive mattress support system, the expandable air cushions 13 will expand in a vertical direction when air under pressure is applied thereto and will contract in a vertical direction when air is released therefrom.

The air cushions are mounted on separate pedestals 15, which underlie the air cushions, and underlie frame support members 16 which, in turn underlie the rectangular frame member 9. Mechanical support is provided by intersecting link arrangements, disposed at the front and rear of each of the cushions, consisting of link member 17 pivotally connected at 21 with link member 19. The bottom end of link member 17 is pivotally connected, at 23, to pedestal 15, and the top end of link member 19 is pivotally connected, at 25, to a frame support member 16. As can be seen, the bottom of link member 17 and the top of link member 19 are connected to the pedestal and frame support member respectively on the same side of the mattress support arrangement.

The other end of link member 17 is pivotally connected, at 29, to one end of short link 27 whose other end is pivotally connected, at 31, to frame support member 16. The other end of link member 19 is pivotally connected, at 35, to one end of short link 33 those other end is pivotally connected, at 37, to pedestal 15. Accordingly, the arrangements 17, 27 and 19, 33 comprise articulated link members.

Figure 5:
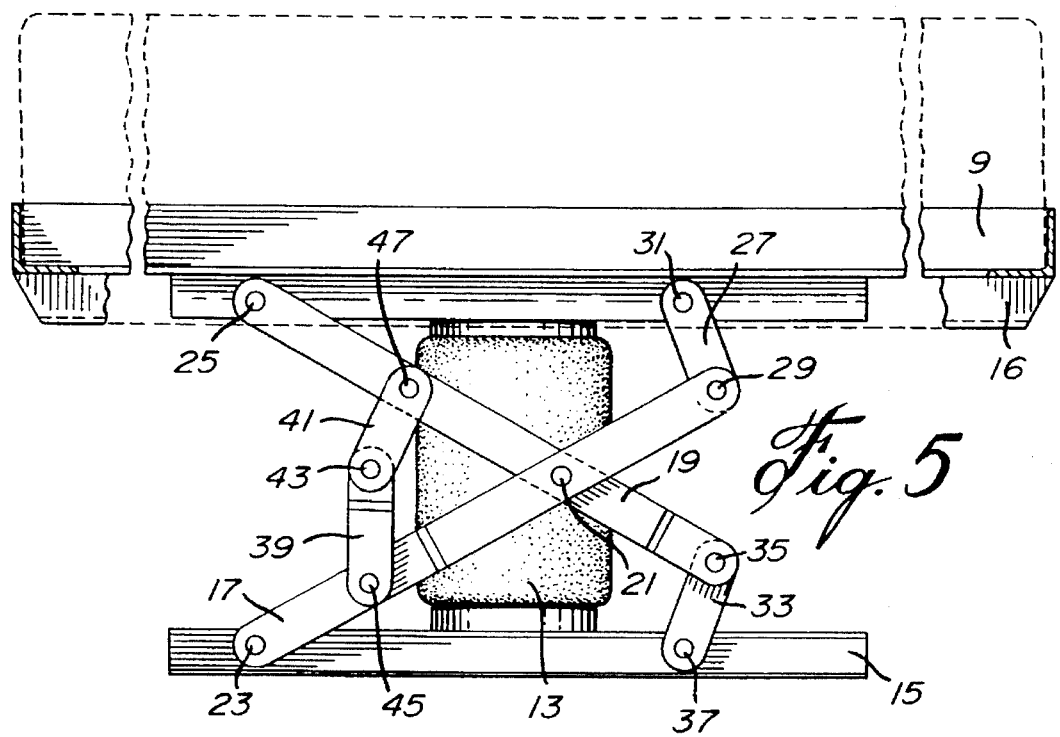
FIG. 5 is a view similar to FIG. 4 but including a vertical movement limitation feature.
Figure 3:
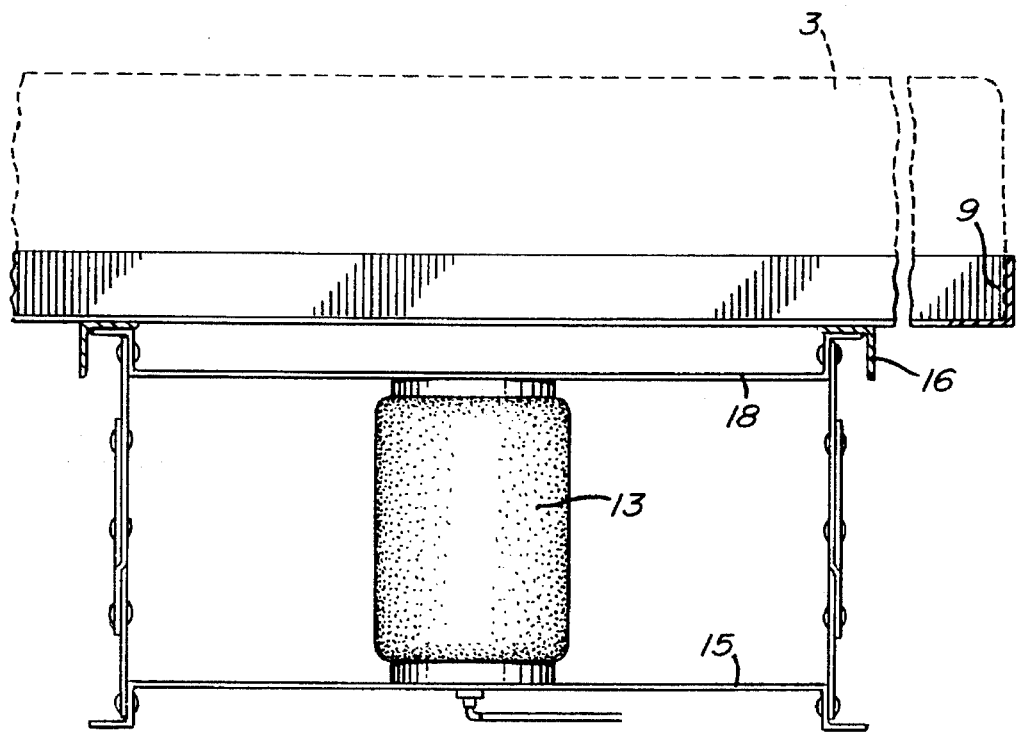
FIG. 3 is a side view of one of the expandable air cushions and its supporting structure.

As seen in FIG. 5, one end of limiting link 39 is pivotally connected, at 45, to link member 17 and one end of limiting link 41 is pivotally connected, at 47, to link 19. The other ends of 39 and 41 are pivotally connected to each other at 43.

As seen in FIG. 2, air hose 49 has one end thereof connected to the input of a control unit 51. One output of the control unit is connected to hose 53 which is connected to an input of one of the expandable air cushions 11, and the other output of the control unit 51 is connected to air hose 55 which is connected to the input of the other expandable air cushion 13. The other end of hose 49 is connected to a source of air under pressure 57 which can comprise either the compressed air supply of the vehicle itself or a separate supply of air under pressure. Control knobs 50 and 60 permit or block the passage of air to their respective air hoses 53 and 55 and also adjust the amount of air under pressure permitted to flow in the respective air hoses.

Control knobs 50 and 60 may control valves with continuously varying openings, the extent of the openings being controlled by knobs 50 and 60, as well known in the art.

In operation, if it is desired to raise the mattress vertically, then control knobs 50 and 60 are opened to the same extent so that air under pressure is applied equally to both expandable air cushions 13. The air cushions 13 will expand vertically, and the intersecting link arrangements will follow the motion of their respective air cushions.

When the desired height has been attained, the control knobs are adjusted so that no further air is applied to the air cushions. As can be seen, the intersecting link arrangements will provide mechanical support for the rectangular frame 9 and the mattress 3 on the frame. To lower the mattress, air is released equally from both of the expandable air cushions.

To tilt the mattress, air under pressure is applied to only one of the air cushions 13. Thus, if it is desired to tilt the mattress so that the right-hand side is above the left-hand side, then air under pressure would be applied to the right-hand expandable air cushion 13. However, in order for this feature to be properly utilized, without hinges, some of the connections 21, 25, 31, 23 and/or 37 must be loose bushings, and a certain strain in the link members 16, 17 (flat bars) must be tolerated.

Figure 6:
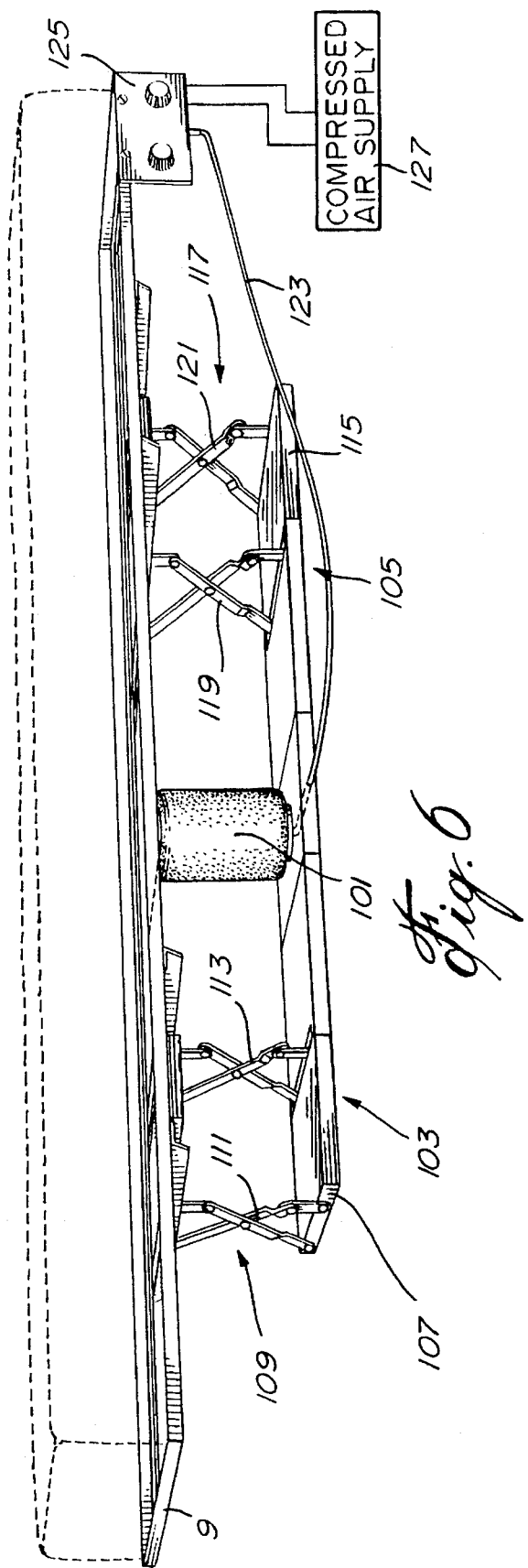
FIG. 6 illustrates a second embodiment of the invention.
Figure 4:
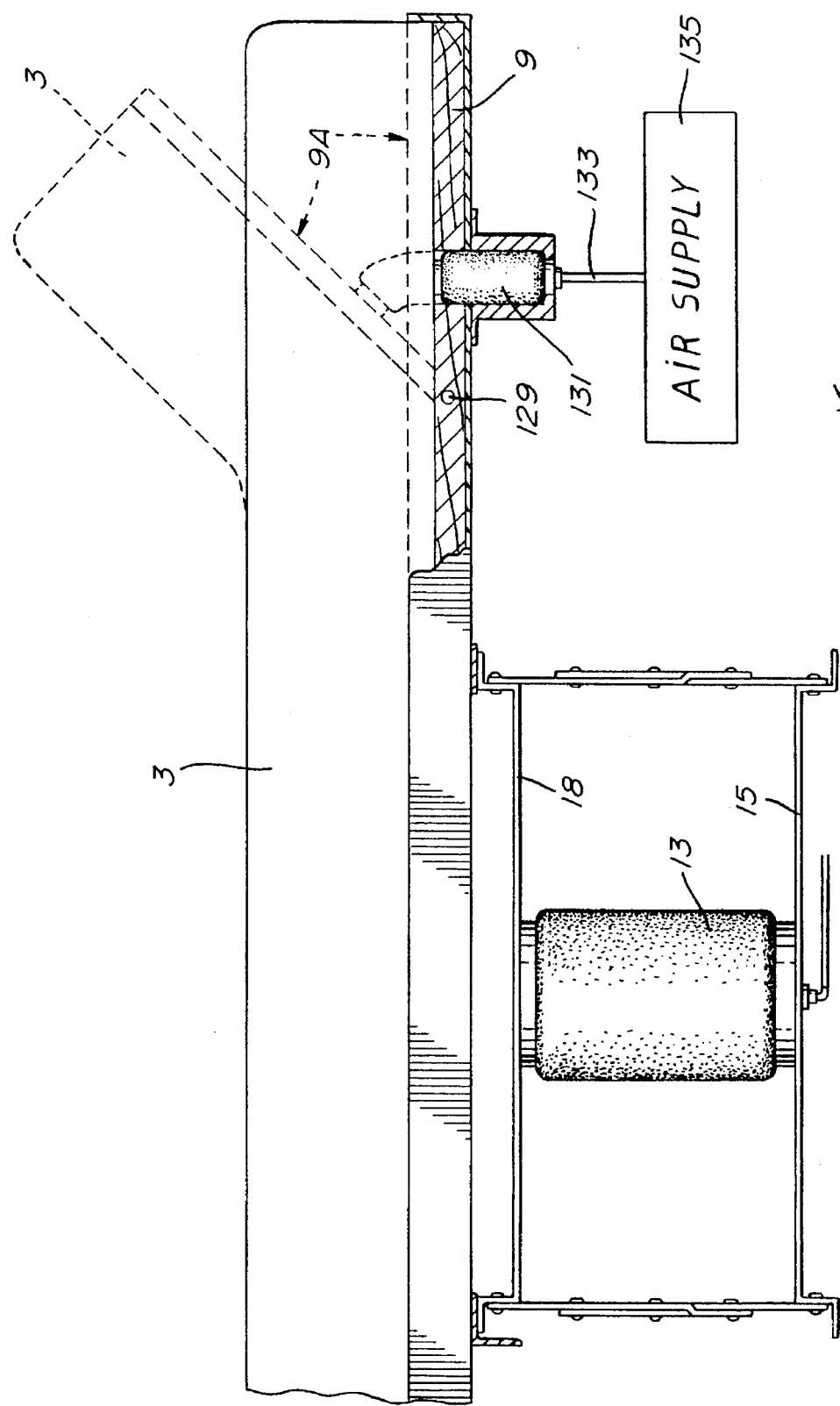

Referring now to FIG. 6, it can be seen that in this case the adjustable support system consists of a single expandable air cushion 101 and mechanical supports 103 and 105 disposed on either side of the expandable air cushion 101. The mechanical support 103 comprises a pedestal 107 and an intersecting link arrangement 109 consisting of intersecting links 111 and 113. In a like manner, the mechanical support 105 consists of a pedestal 115 and an intersecting link arrangement 117 consisting of intersecting links 119 and 121. Although the intersecting link arrangements 109 and 117 are shown to contain a pair of intersecting links, it will of course be obvious that only a single intersecting link could be provided on either side of the expandable air cushion 101. For example, intersecting links 111 and 121 alone could be provided or intersecting links 113 and 119 could be provided.

The intersecting links are identical to the intersecting links as described in association with FIGS. 1 to 5 herein.

Once again, a hose 123 is connected to an input of expandable air cushion 101 and to an output of a control unit 125. Connected to an input of the control unit 125 is a compressed air supply 127. In this embodiment, the frame 9 is movable only up and down in a vertical direction and is not tiltable as in the embodiments illustrated in FIGS. 1 to 5.

The modification illustrated in FIG. 7 can be applied to either the embodiment illustrated in FIGS. 1 to 5 or the embodiment illustrated in FIG. 6. In FIG. 7, it is shown as applied to the embodiment of FIGS. 1 to 5.

As can be seen, the frame member 9 includes a portion 9A which is pivotable about a hinge 129 so that it can be tilted as shown in dotted lines in FIG. 7. The portion 9A is tiltable by an air spring 131 which is connected by hose 133 to an air supply 135. Appropriate controls would, of course, be provided.

The portion 9A would typically be at the head of the mattress and would be tiltable to permit a person to either lie up or sit up on the mattress.

As seen in FIG. 5, when limiting link 39 is aligned with limiting link 41, further vertical expansion of the intersecting link is no longer possible. Accordingly, the arrangement of 39, 41 limits the vertically upward motion of the vertical adjusting system.

It is also noted that the linking arrangement will limit the downward compression on the air cushion 13. Thus, when limiting link 39 becomes aligned with link 19, limiting link member 41 and limiting link 33 will provide a spacing between link 19 and limiting link 39. Thus, the extent to which the expandable air cushion 13 can be compressed is limited. This will prevent further downward compression of the air cushion 13 caused by improper inflation or a total loss of air system pressure.

As will also be seen, because of the articulated nature of the intersecting links 17, 27 and 19, 33, a certain degree of horizontal tilting is permitted whereby to isolate the mattress from pitching motion and the like of the cab of the truck.

Although a particular embodiment has been described, this was for the purpose of illustrating, but not limiting, the invention. Various modifications, which will come readily to the mind of one skilled in the art, are within the scope of the invention as defined in the appended claims.

I claim:

1. An adjustable mattress support arrangement for adjustably supporting a mattress in the cab of a truck, comprising:

an elongated mattress support member for supporting the mattress, said mattress support member having a longitudinal axis;

base means spaced below said mattress support member;

at least a first vertical adjusting system located between said base means and said mattress support member for varying a vertical position of said mattress support member relative to said base means, said first vertical adjusting system comprising:

expandable gaseous fluid cushion means being expandable and contractable in the vertical direction located between said base means and said mattress support member;

first and second intersecting link arrangements, each of said first and second intersecting link arrangements having first and second pivotally interconnected link members oriented for movement in a vertical plane which extends laterally of said longitudinal axis, a first end of said first link member being pivotally connected to said mattress support member and a first end of said second link member being pivotally connected to said base means, a second end of said first link member being pivotally connected to a first end of a first short pivot lever and a second end of said second link member being pivotally connected to a first end of a second short pivot lever, a second end of said first short pivot lever being pivotally connected to said base means and a second end of said second short pivot lever being pivotally connected to said mattress support member, and a pair of pivoted rigid limit members extending between and pivotally connected to said first and second link members to provide both upper and lower limits to the vertical position, said first and second intersecting link arrangements being expandable and contractable with the expansion and contraction of said expandable cushion means; and means for applying a gaseous fluid under pressure to said expandable cushion means whereby the vertical position of said mattress support member can be adjusted and whereby said mattress support member is supported by said expandable cushion means and said first and said second intersecting link arrangements of said first vertical adjusting system at all vertical positions thereof.

2. A support arrangement as defined in claim 1, wherein said mattress support member has a front half and a rear half;

wherein said arrangement further comprises a second vertical adjusting system located between said base means and said mattress support member, said second vertical adjusting system comprising:

expandable gaseous fluid cushion means being expandable and contractable in the vertical direction located between said base means and said mattress support member;

first and second intersecting link arrangements, each of said first and second intersecting link arrangements having first and second link members oriented for movement in a vertical plane which extends laterally of said longitudinal axis, a first end of said first link member being pivotally connected to said mattress support member and a first end of said second link member being pivotally connected to said base means, a second end of said first link member being pivotally connected to a first end of a first short pivot lever and a second end of said second link member being pivotally connected to a first end of a second short pivot lever, a second end of said first short pivot lever being pivotally connected to said base means and a second end of said second short pivot lever being pivotally connected to said mattress support member, and a pair of pivoted rigid limit members extending between and pivotally connected to said first and second link members, said first and second intersecting link arrangements being expandable and contractable with the expansion and contraction of said expandable air cushion means;

wherein said first vertical adjusting system underlies said front half of said mattress support member and said second vertical adjusting system underlies said rear half of said mattress support member;

wherein said first intersecting link arrangement of each of said first and second vertical adjusting systems is located on a side of said expandable cushion means which is opposite to said second intersecting link arrangement of the same of said first and second vertical adjusting systems; and wherein said means for applying gaseous fluid separately applies gaseous fluid to said expandable cushion means of said first and second vertical adjusting systems whereby the vertical height of said mattress support member can be adjusted at either of said halves individually or at both of said halves simultaneously and whereby each of said halves is supported by said expandable cushion means and said first and second intersecting link arrangements of one of said first and second vertical adjusting systems at all vertical positions thereof.

3. An adjustable mattress support arrangement as defined in any one of claim 2 wherein said elongated mattress support member comprises a tiltable portion;

said tiltable portion being tiltable about a hinge means;

air spring means underlying said tiltable portion for adjusting the tilt of said tiltable portion.

4. A support arrangement as defined in claims 2, wherein said arrangement further comprises a separate frame support member overlying each of said expandable cushion means and being in physical engagement therewith, said frame support members underlying said mattress support member and being in physical engagement therewith; and wherein said base means underlies each of said expandable cushion means and is in physical engagement therewith, said base means being mounted to the cab of the truck.

5. A support arrangement as defined in claim 4, wherein said second end of said second short pivot lever of each of said first and second intersecting link arrangements is pivotally connected to one of said frame support members;

wherein said first end of said first link member of each of said first and second intersecting link arrangements is pivotally connected to one of said frame support members; and wherein said first link member of each of said first and second intersecting link arrangements is pivotally connected to said second link member of the same of said first and second intersecting link arrangements.

6. An arrangement as defined in claim 5 and further including a control unit having an input, a first output and a second output;

a first hose means connecting said input to a source of high pressure;

a second hose means connecting said first output to one of said expandable air cushions; and a third hose means connecting said second output to the other one of said expandable air cushions.

7. A support arrangement as defined in claim 1, wherein said pair of rigid limit members of each of said first and second vertical adjusting systems comprises:

a first limiting link pivotally connected, at one end thereof, to said first link member;

a second limiting link pivotally connected, at one end thereof, to said second link member;

the other ends of said first and second limiting links being pivotally connected to each other.

8. An adjustable mattress support arrangement as defined in claim 1 wherein said elongated mattress support member comprises a tiltable portion;

said tiltable portion being tiltable about a hinge means;

air spring means underlying said tiltable portion for adjusting the tilt of said tiltable portion.

* * * * *